United States Patent [19]

Erickson

[11] 4,144,554

[45] Mar. 13, 1979

[54] CIRCUIT BREAKER BOLT-ON FLEXIBLE CONNECTOR

[75] Inventor: Kenneth W. Erickson, Lincoln, Nebr.

[73] Assignee: Square D Company, Park Ridge, Ill.

[21] Appl. No.: 842,450

[22] Filed: Oct. 17, 1977

Related U.S. Application Data

[63] Continuation-in-part of Ser. No. 748,607, Dec. 8, 1976, abandoned.

[51] Int. Cl.² .............................................. H02B 1/04
[52] U.S. Cl. ..................................... 361/355; 361/353;
200/51 R
[58] Field of Search ..................... 200/51 R, 293, 294;
361/353, 354, 355, 358, 361, 363; 339/19, 28, 29
R, 29 B

[56] References Cited

U.S. PATENT DOCUMENTS

| | | | |
|---|---|---|---|
| 2,020,913 | 11/1935 | Schramm | 361/353 |
| 3,280,379 | 10/1966 | Ellsworth | 361/353 |
| 3,287,607 | 11/1966 | Jacobs | 361/353 |
| 3,383,483 | 5/1968 | Powell | 361/353 |
| 3,907,391 | 9/1975 | Emery | 339/29 R |

Primary Examiner—Gerald P. Tolin
Attorney, Agent, or Firm—Norton Lesser; Richard T. Guttman

[57] ABSTRACT

A flexible connector for connecting a circuit breaker in a panelboard wherein the connector comprises a plurality of thin metal straps which are fused together at each end. One end includes an aperture to receive a bolt for bolting to the bus bar of a panelboard. The other end of the flexible connector includes the stationary contact of the circuit breaker, and this end is trapped in the circuit breaker with the stationary contact in position for engagement with the movable contact of the breaker. The flexible connection extends outwardly from the breaker and may be doubled under, so when bolted to the bus bar of the panelboard, the bolted end of the connection lies under one end of the circuit breaker. In a modification a jaw member is included at an intermediate point between the stationary contact end and the bolt receiving end of the connector. The jaw means clamps on an upwardly extending portion of the bus bar of the panelboard to provide a combined snap-on connection with the flexible bolt-on connector.

4 Claims, 10 Drawing Figures

U.S. Patent  Mar. 13, 1979  Sheet 1 of 3  4,144,554
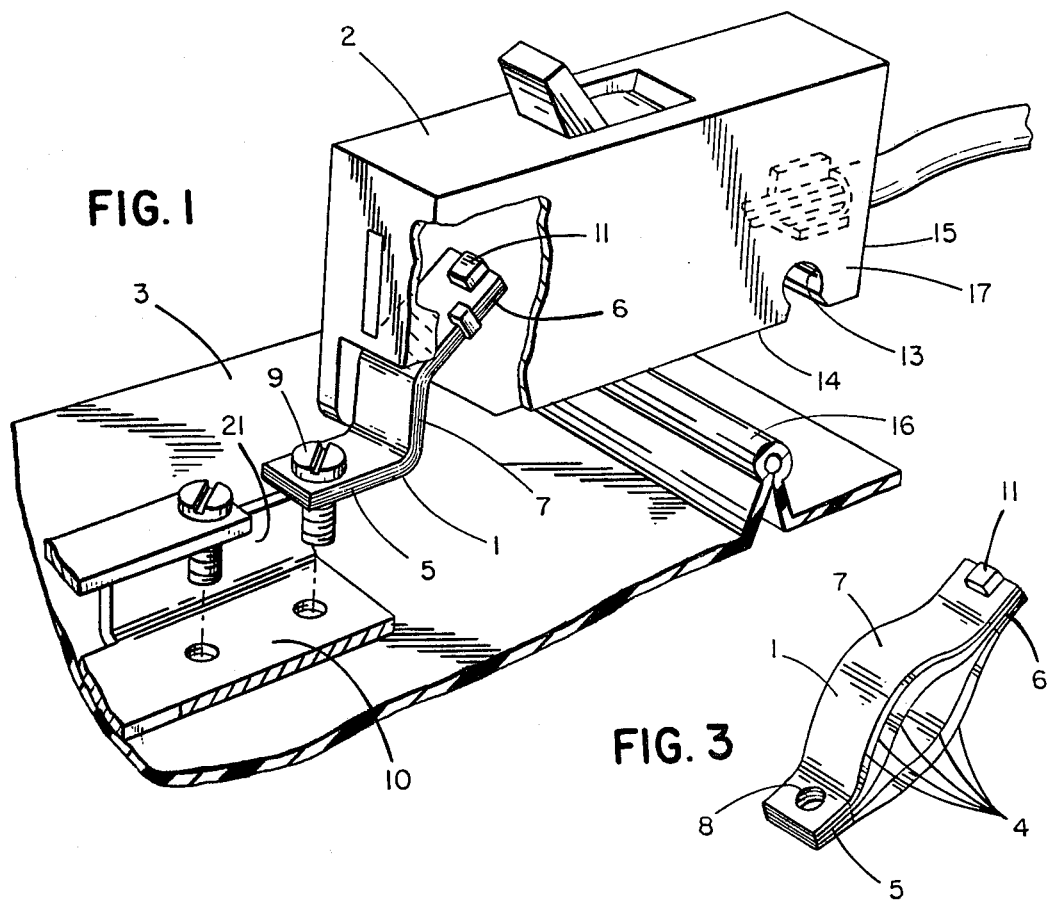
FIG. 1
FIG. 3
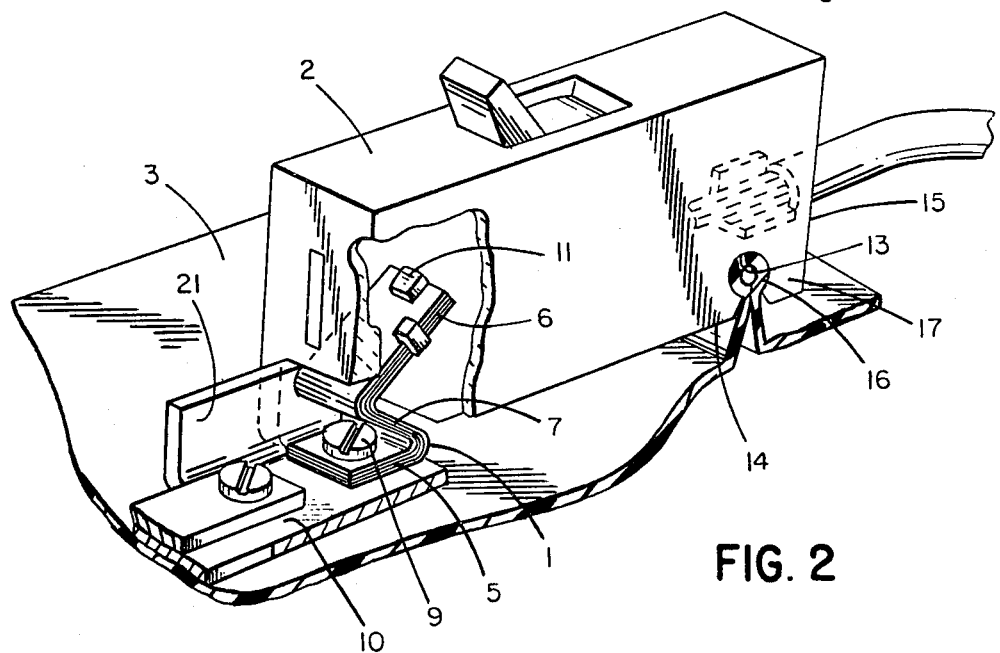
FIG. 2

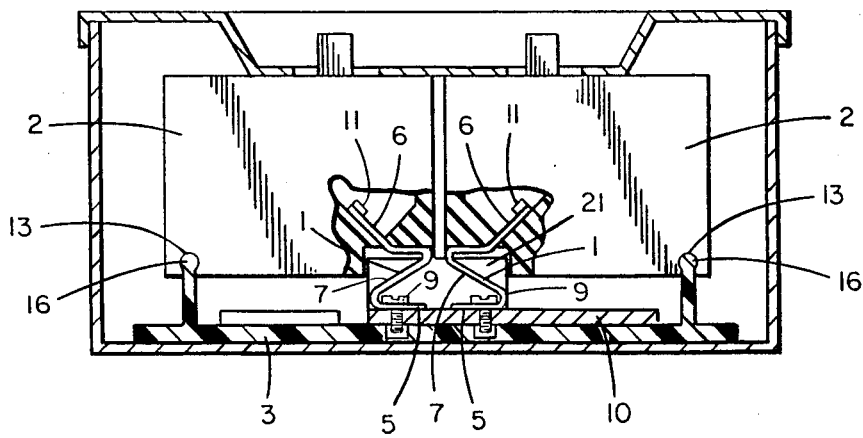
FIG. 4
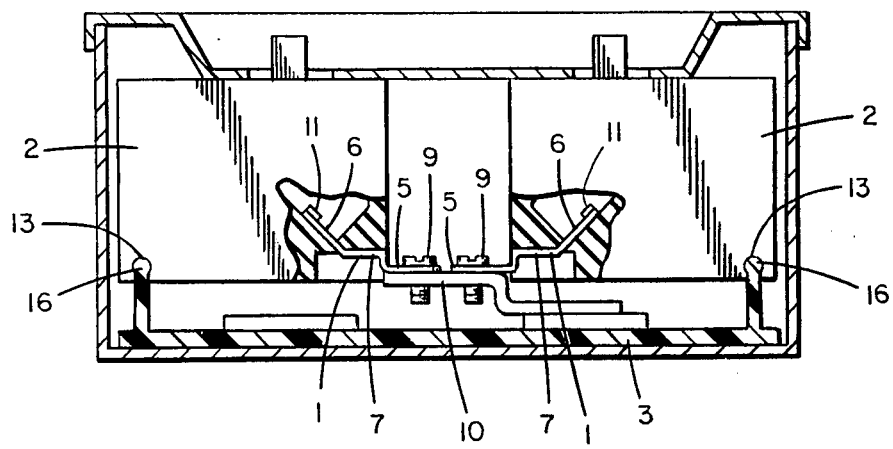
FIG. 5
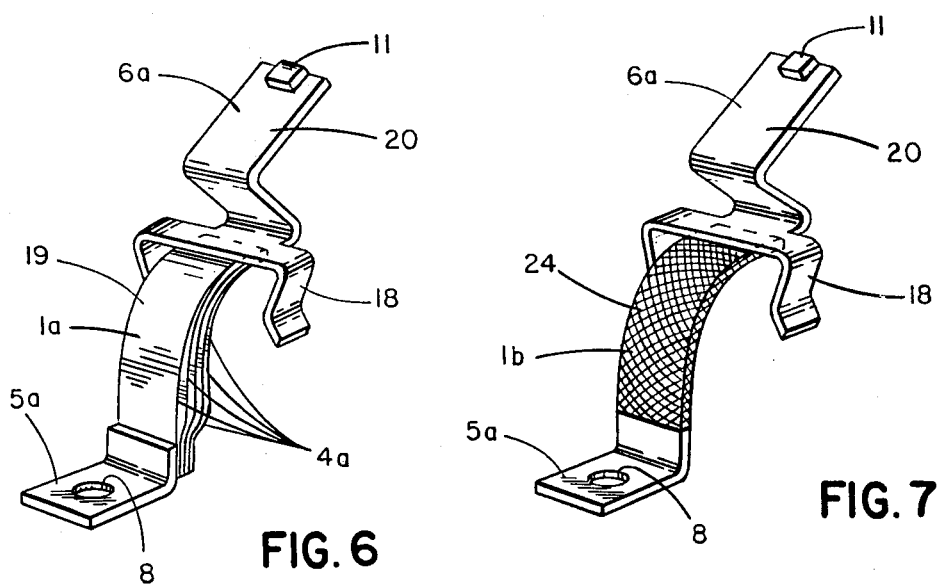
FIG. 6
FIG. 7

CIRCUIT BREAKER BOLT-ON FLEXIBLE CONNECTOR

BACKGROUND OF THE INVENTION

This is a continuation-in-part application of application Ser. No. 748,607 filed Dec. 8, 1976, now abandoned, and the invention relates to the field of connecting members for circuit breakers which are mounted in a panelboard.

In circuit breakers of this type the circuit breaker is mounted at one end by an electrically insulated means, such as a rail in the panelboard and a corresponding recess in the insulated molded case of the breaker to attach one end of the breaker to the panelboard in such electrically insulated connection. The other end of the breaker is electrically connected to the bus bar of the panelboard. In a typical embodiment of prior art connections to the bus bar of a panelboard, a rigid metal strap has been provided which extends longitudinally outward from the circuit breaker. The outwardly extending portion of the rigid metal strap has either included a jaw member formed thereon for connection to a corresponding prong or projecting member of the panelboard bus bar, or in an alternate construction, the extending portion of the rigid metal strap has included an aperture for receiving a bolt therethrough to bolt the metal strap to the panelboard bus bar. In either of these cases the electrical connection of the breaker in the panelboard has extended longitudinally outward from the breaker thus requiring more space.

Another known embodiment has provided a conductive member extending from the stationary contact of the breaker outwardly to a jaw member which was positioned under one end of the breaker so the breaker could be snapped in place on a corresponding projecting member of the panelboard bus bar. However, such connections have the disadvantage that the member of the bus bar resulting in a high resistance connection. In some cases the jaw member may slip entirely off of the projecting member of the bus bar.

SUMMARY OF THE INVENTION

The present invention provides a flexible multi-strip connector or terminal, which is foldable underneath an end of the circuit breaker whereby one end of the flexible connector can be bolted to the panelboard bus bar before the circuit breaker is fully seated in place in the panelboard. After bolting the one end of the flexible connector, the flexible intermediate portion of the connector may be bent underneath that end of the circuit breaker as it is seated in place within the panelboard. The other end of the circuit breaker is engaged with a mounting rail of the panelboard. The length and folding of the terminal are chosen to hold the circuit breaker firmly against movement. In this manner the present invention provides a bolted connection for a circuit breaker in a panelboard which does not extend longitudinally outwardly from an end of the circuit breaker. Such construction minimizes the space needed in a panelboard for a given number of circuit breakers.

It is the object of the invention to provide a flexible connector for the electrically conductive end of a circuit breaker mounted in a panelboard including a member which comprises a plurality of thin metal strips in overlaying relationship fused together at each opposite end, one end having the stationary contact of the circuit breaker mounted thereon and the other end having an aperture to receive a bolt for a bolted connection to the bus bar of a panelboard.

It is an object of the invention to provide a flexible connection for the electrically conductive connection of a circuit breaker to a panelboard in which the connector may be bolted to the bus bar of the panelboard and the connector folded under an end of the circuit breaker to lie under the circuit breaker when it is mounted in place on the panelboard.

It is an object of the invention to provide a flexible connector to electrically connect a circuit breaker to a panelboard in which the flexible connector includes a plurality of overlying metal strips fused together at each end, an aperture at one end to receive a bolt for bolted connection to the panelboard bus bar, the opposite end being welded to a second connector which includes a jaw member and a strap extending therefrom on which the stationary contact of a breaker is mounted, to provide a combined snap-on and bolt-on connection which when connected in the panelboard lies wholly under an end of the circuit breaker.

It is an object of the invention to provide a second low resistance connection for a circuit breaker, which connection lies wholly under the circuit breaker when mounted in place in a panelboard.

BRIEF DESCRIPTION OF THE DRAWING

FIG. 1 is a perspective view of a circuit breaker having a flexible connector in accordance with this invention shown in position for mounting of one end to the rail of a panelboard and the other end to the bus bar.

FIG. 2 is a perspective view of a circuit breaker and a flexible connector in accordance with this invention shown with the circuit breaker mounted in position in the panelboard, a fragmentary portion of the panelboard being shown.

FIG. 3 is a perspective view of a flexible connector in accordance with this invention showing the multiple strips spread apart and each opposite end fused together, one end including an aperture and the opposite end including the stationary contact.

FIG. 4 is a side elevation partially broken away of two circuit breakers mounted in a panelboard in end-to-end relationship showing the flexible connectors in accordance with this invention folded underneath respective ends of each circuit breaker.

FIG. 5 is a side elevation view similar to FIG. 4 illustrating two circuit breakers mounted in a panelboard having bolt-on connectors of the type previously known which project outwardly from the end of the breakers.

FIG. 6 is a perspective view of a modified flexible connector in accordance with this invention which includes a jaw member for combined bolt-on and plug-on connection.

FIG. 7 is a perspective view of another modified flexible connector in accordance with this invention which includes a braided cable and a jaw member providing a combined bolt-on and plug-on connection.

DESCRIPTION OF PREFERRED EMBODIMENT

Figure 8:
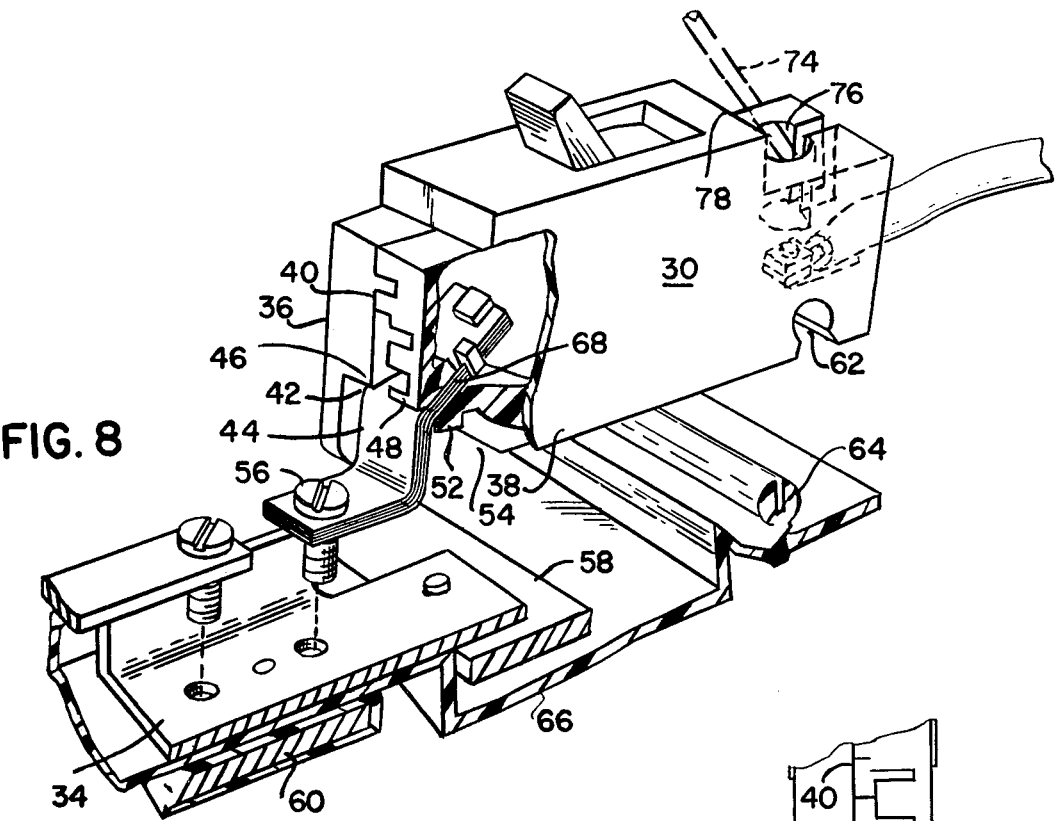
FIG. 8 is an isometric view illustrating further details of the circuit breaker housing and a portion of an interior assembly.

A flexible connector 1 for a circuit breaker 2 to be mounted in a panelboard 3 includes a plurality of thin metal strips 4 of copper or other conductive metal which are fused together at each opposite end 5 and 6. The thin metal strips 4 are in overlaying relationship throughout the intermediate portion 7 of the flexible connector between each opposite end. The thin metal strips 4 are not joined together throughout the intermediate portion 7 which results in increased flexibility of the connector. An aperture 8 is formed in the end 5 of flexible connector 1 to receive a bolt 9 for bolting the end 5 to a connector 9a secured to the bus bar 10 of the panelboard 3. The opposite end 6 of flexible connector 1 includes a stationary contact 11 which is mounted in place in the circuit breaker 2 for contact with a movable contact. The circuit breaker 2 includes a lateral recess 13 opening to the lower side 14 of the circuit breaker 2 near the forward end 15. Mounting rail 16 is provided in the panelboard 3 which seats in lateral recess 13 when the circuit breaker 2 is mounted in place. The connection formed by mounting rail 15 and laterial recess 12 is electrically insulated since the walls bounding recess 13 are the same molded plastic as the case 17 of the circuit breaker 2.

The thin conductive strips 4 may be of differing thicknesses to vary the amount of electrical current which may be carried by each strip. The conductive strips are of copper or other conductive metal, and may be coated with silver or tin.

A modification of the invention is illustrated in FIG. 6. This modification includes a jaw member 18 secured at an intermediate location between the bolt receiving end 5a and the stationary contact end 6a of the modified connector 19. The flexible connector portion 1a of the modified connector 19 is shorter than the flexible connector 1 described above. The flexible connector portion 1a of the modified connector 19 comprises a plurality of flexible thin metal strips 4a in overlying relationship fused together at end 5a, in which end aperture 8 is formed. The opposite end 5b of the flexible portion 1a is welded to the jaw member 18. A rigid metal strap 20 extends from jaw member 18 in a direction oppositely from the flexible connector portion 1a. The stationary contact 11 of circuit breaker 2 is affixed to the end 6a of the rigid metal strap 20. The rigid metal strap 20 of the modified connector 19 is mounted in a circuit breaker 2 in the same manner as described for the end 6 of flexible connector 1, namely with stationary contact 11 positioned for contact with the movable contact of the circuit breaker 2. The jaw member 18 of modified connector 19 is positioned beneath an end portion of the circuit breaker 2 for seating on an upwardly projecting prong member 21 of the bus bar 10. A bolt 9 is inserted through aperture 8 in the end 5a of flexible connector portion 1a and the bolt is threaded into a corresponding threaded aperture 22 of the panelboard bus bar 10. The threaded aperture 22 of bus bar 10 is located in such a position that the end 5a of flexible connector portion 1a and the bolt 9 underlay the cross arm 23 of the jaw member 18 when the circuit breaker 2 is fully connected to the panelboard bus bar 10. When the circuit breaker 2 is positioned in the panelboard with jaw member 18 in position to engage the prong member 21 of bus bar 10, the flexible connector portion 1a of modified connector 19 bends back on itself thus enabling the bolted end 5a to underlie the circuit breaker 2. In this manner a flexible bolt-on connector is provided which does not project outwardly in a longitudinal direction from the circuit breaker 2, and this modification combines such bolted connection with an auxiliary plug-on connection. The jaw member 18 of the modified connector 19 serves not only as an additional electrical connection, but also serves as a mechanical connection to secure the circuit breaker 2 to the panelboard bus bar 10 against outward and lateral movement which may otherwise be possible if a flexible bolt-on connector alone is use.

Another modification of the invention is the modified connector 24 illustrated in FIG. 7. This modification is similar to the connector 19 shown in FIG. 6 except that the flexible connector portion 1b consists of a braided cable of conductive metal. In other respects modified connector 20 is the same as modified connector 19.

In FIG. 8 a bolt-on type circuit breaker indicated by the reference character 30 is shown together with a relevant portion of an interior assembly of the type disclosed in a copending application Ser. No. 842,432 by Diersing and a relevant portion of a bus stab 34 disclosed in a copending application Ser. No. 842,430 by Bishop.

Figure 9:
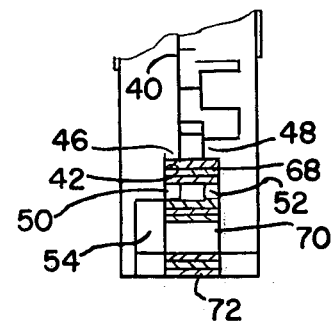
FIG. 9 is an end elevational view of a portion of the circuit breaker housing illustrating the terminal in section.

The circuit breaker 30 comprises a housing formed by a pair of mating housing portions 36 and 38 joined along a seam indicated at 40 in FIGS. 8 and 9. The housing or portions 36 and 38 when mated or engaged define an opening 42 through which a flexible connector strap or terminal 44 of the type described extends from the internal circuitry of the breaker. Each housing portion has a wall 46 and 48 respectively defining the upper margin of the opening 42 and a wall 50 and 52 respectively defining the lower margin of the opening 42 and about which the strap 44 folds for placement in a lower recess 54 of the breaker and securement to the bus stab 34 by means of bolt 56.

The bus stab 34 may be secured either to a side bus bar such as 58 or a center bus bar 60 and after the strap 44 is secured to the bus stab 34 the housing of circuit breaker 30 is adapted to be secured by means of recess 62 to either one of a pair of mounting rails such as 64 integrally formed adjacent opposite sides of a plurality of modular insulators such as 66 as set forth in the aforementioned copending applications.

The recess 62 is provided adjacent the end of circuit breaker housing opposite the opening 42 and since the housing may move about the axis of the arcuate bead forming rail 64, it is important that the terminal 44 be secured in a manner preventing movement of the breaker.

Therefore, when the flexible strap 44 is folded about walls 50 and 52 into recess 54 a first segment 68 is formed extending to walls 46, 48, 50 and 52 from the internal circuitry of the breaker. A second segment 70 is formed by the fold about lower walls 50 and 52 which extends from walls 50 and 52 into substantially tangential relationship with the head of bolt 56 and a third segment 72 is then formed which is connected by the bolt 56 to the stab and the respective bus bar 58 or 60.

Thus, the length of the flexible terminal 44 and segment 70 is of considerable importance, since if it is too long, the corresponding end of the circuit breaker may be moved relative the bus stab, while if it is too short, the strap 44 exerts a force on the bolt head and therefore on the connector or bus stab tending to pull the bus stab from its support. To provide the space saving benefits of the foldable terminal, the terminal must be held from significant movement after it is folded.

Figure 10:
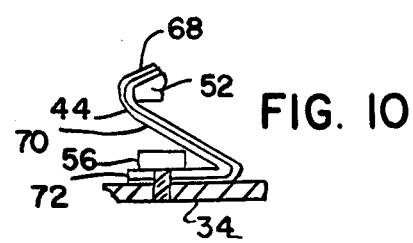
FIG. 10 is a schematic illustration of the folded condition of the terminal.

To avoid movement the length of segment 70 between its support position, where segment 70 is folded about walls 50 and 52 to extend in a reverse direction from segments 68 and 72, is selected to be in substantially tangential engagement with the head of bolt 56 at the side or edge facing rail 64 when the circuit breaker is engaged with the rail 64. Thus only a minor amount of slack may be provided between the bolt head and the juncture of segments 70 and 72, as shown in FIG. 10.

To assemble the bolt-on circuit breaker 30, the bolt 56 extending through segment 72 is threaded into the back leg of U shaped connector 34 with the segments conveniently unfolded to extend linearly from the breaker. The segment 70 then folds into the housing recess 54 in the lower side of the circuit breaker housing, as the circuit breaker housing is moved to align recess 62 with the rail 64 and the rail 64 is engaged in the recess 62.

The circuit breaker is now securely held at both ends, since rotation about the rail 64 requires the extension of segment 70 in the direction of the head of bolt 56 to accomodate the radial movement of the housing. This movement cannot occur since the segment 70 has a length selected to be engaged with the bolt head before the recess 62 can move significantly relative the rail 64. This prevents movement of the circuit breaker about or from the rail 64, except as will be described.

To disassemble the circuit breaker from the rail 64 and stab 34, a screw driver 74 is inserted in the elongated vertical slot 76 extending from an upper surface of the circuit breaker above the recess 62 and the screw driver 74 is engaged with a wall of slot 76 and forced against an upper corner 78 of the breaker housing. The corner 78 is located intermediate the breaker ends and the force moves the breaker longitudinally toward the bolt 56. This forces the outermost portion of the split rail or bead 64 toward the other portion of the bead to thereby reduce the distance therebetween and permits the housing to pivot from the rail about an axis located adjacent the bolt 56 so that the rail is disengaged from the housing. It will be noted that this longitudinal movement can occur because some slack is provided between the position where segment 70 engages the head of bolt 56 and the fold or juncture with segment 72, as shown in FIG. 10.

The foregoing is a description of an improved bolt or circuit breaker whose invention concepts are believed set forth in the accompanying claims.

I claim:

1. A circuit breaker having a housing engaging a mounting rail spaced from a bus stab in a panelboard, the improvement comprising:
   a flexible terminal connecting said breaker to said bus stab in said panelboard, said terminal having a flexible portion extending from said housing,
   securing means on said terminal detachably securing said flexible portion to said bus stab in said panelboard at a first position spaced a first predetermined distance from said mounting rail in said panelboard with said portion thereafter folded between said housing and said bus stab in said panelboard,
   rail receiving means on said housing detachably securing said housing pivotally to said mounting rail in said panelboard, said rail receiving means spaced a greater predetermined distance from said securing means than said first predetermined distance prior to the securing of said flexible terminal to said bus stab, said rail receiving means spaced said first predetermined distance from said securing means in response to the securing of said flexible portion at said first position to said bus stab in said panelboard, and
   a fold wall on said housing engaging and folding said flexible portion between said housing and said bus stab in said panelboard in response to the operation of said securing means to secure said portion to said bus stab in said panelboard at said first position and the operation of said rail receiving means to detachably secure said housing to said mounting rail.

2. The circuit breaker claimed in claim 1 in which said housing overlaps said securing means with said flexible portion positioned between said housing and said securing means in overlapping engagement with said securing means, said flexible portion having a length corresponding to the straight line distance between said securing means and fold wall in response to the folding of said flexible portion in overlapping engagement with said securing means to secure said flexible portion to said bus stab, and the securing of said housing to said mounting rail in said panelboard to prevent relative movement between said housing and said mounting rail.

3. In the improvement claimed in claim 2, a longitudinally split mounting rail, and a bus stab to which said flexible portion is secured at said first position, said rail receiving means on said housing including a slot in said housing to pivotally receive said mounting rail for pivoting movement about the longitudinal axis of said rail, said axis spaced from said fold wall by a distance greater than the folded length of said flexible portion between said securing means and folding wall to require a force to be exerted against said rail moving one portion of said split rail toward the other portion of said split rail to disengage said housing from said rail.

4. A combination comprising:
   a circuit breaker including a housing, said housing having end walls and a bottom wall,
   a pair of spaced apart mounting rails each split longitudinally,
   a bus bar between said rails extending parallel to said rails,
   a bus stab located between said rails and having means for securing a pair of circuit breaker terminals thereto in spaced positions, said bus stab spaced from said rails and connected to said bus bar,
   a flexible terminal connecting said breaker to said bus stab, said terminal having a flexible portion extending from said housing,
   terminal securing means on said terminal detachably securing said flexible portion to said bus stab at a first position spaced a first predetermined distance from said mounting rail with said portion thereafter folded between said housing and said bus stab,
   rail securing slot means in said bottom wall detachably securing said housing pivotally to said mounting rail, said rail securing slot means spaced a greater predetermined distance from said terminal securing means than said first predetermined distance prior to the securing of said flexible terminal to said bus stab, said rail securing slot means spaced said first predetermined distance from said terminal securing means in response to the securing of said flexible portion to said bus stab at said first position,
   a fold wall on said housing engaging and folding said flexible portion between said housing and said bus stab in response to the operation of said terminal securing means to secure said portion to said bus stab at said first position and the operation of said rail receiving means to detachably secure said housing to said mounting rail, a second circuit breaker including a housing having end walls and a bottom wall with rail securing slot means in the bottom wall of said second circuit breaker detachably securing said second circuit breaker to the other rail, and terminal means on said second circuit breaker secured to said bus stab at another spaced position, said circuit breakers arranged with one end wall of each breaker in closely spaced facing relationship between said rails in response to the securing of each circuit breaker to a respective mounting rail.

* * * * *

UNITED STATES PATENT AND TRADEMARK OFFICE
CERTIFICATE OF CORRECTION

PATENT NO. : 4,144,554
DATED : March 13, 1979
INVENTOR(S) : Kenneth W. Erickson

It is certified that error appears in the above-identified patent and that said Letters Patent are hereby corrected as shown below:

Col. 3, line 23, change "laterial recess 12" to --lateral recess 13--.

Col. 4, line 10, "use" should be --used--.

Signed and Sealed this

Fourth Day of December 1979

[SEAL]

Attest:

SIDNEY A. DIAMOND

*Attesting Officer*  *Commissioner of Patents and Trademarks*